Sept. 23, 1924.
O. E. STEWART
AUTO BRAKE
Filed Aug. 29, 1923
1,509,532
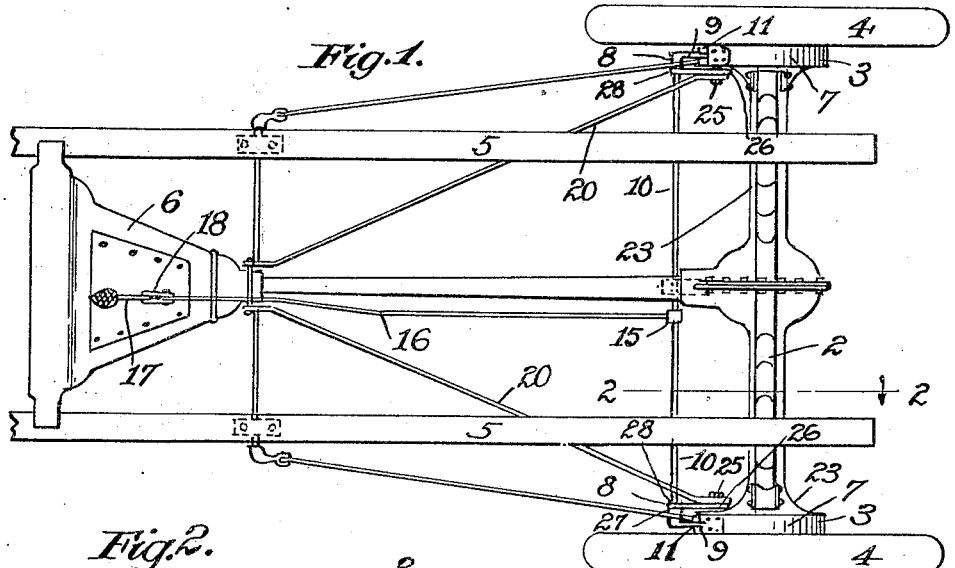
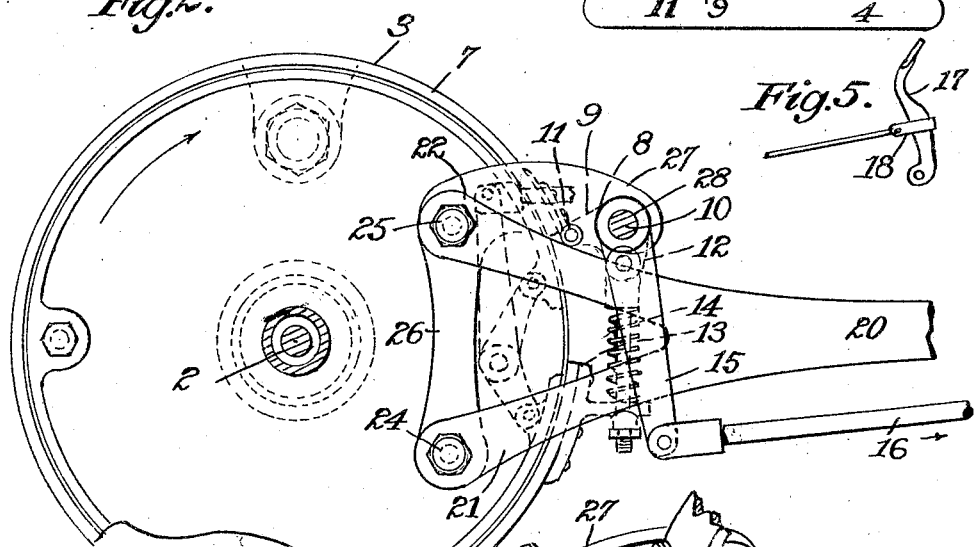
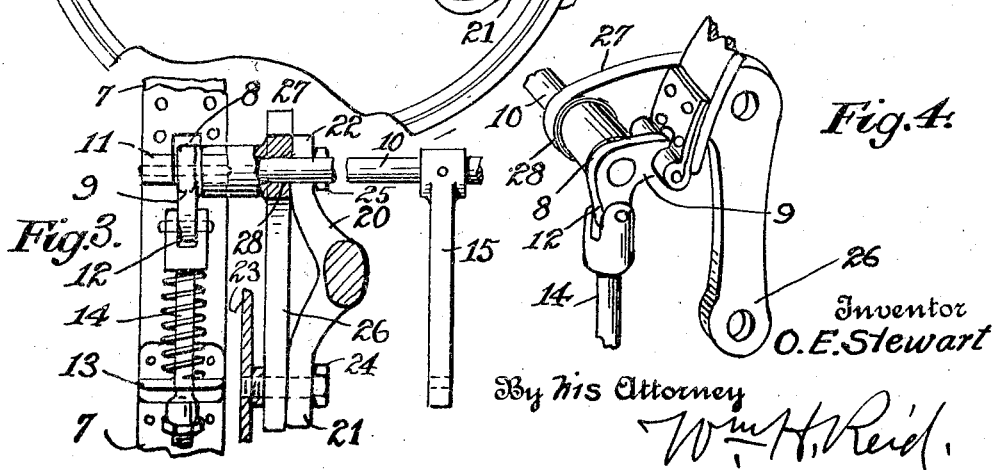
Inventor
O. E. Stewart
By his Attorney
Wm H. Reid Patented Sept. 23, 1924.

1,509,532

UNITED STATES PATENT OFFICE.

OLIVER E. STEWART, OF BROOKLYN, NEW YORK.

AUTO BRAKE.

Application filed August 29, 1923. Serial No. 659,948.

*To all whom it may concern:*

Be it known that I, OLIVER E. STEWART, a citizen of the United States, and a resident of Brooklyn, in the county of Kings and State of New York, have invented certain new and useful Improvements in Auto Brakes, of which the following is a specification.

This invention has reference to a brake attachment for use on motor vehicles, particularly of the Ford type, that usually have a transmission brake for the service brake, and also an internal band brake on the rear wheels, for emergency brake. The object of the invention is to provide an external band brake on the same drum on the rear wheels, to be operated by a cross shaft, with an angle lever on each end of the shaft that engages the ends of the brake band, which shaft can be rocked from the same pedal lever that now operates the transmission brake.

A further object of the invention is to provide a pair of brackets having journal bearing for the cross shaft, and which brackets can be attached to the bolts that secure the rear forked end of the radius rod to the rear axle housing; whereby the attachment can be assembled on the car by merely securing it to the said bolts on the radius rod, and connecting a pull rod with an arm on the cross shaft and with the transmission brake pedal.

In the accompanying drawing showing one embodiment of my invention, Fig. 1 is a plan view of the chassis rear portion of a car.

Fig. 2 shows enlarged a sectional view of the line 2—2 of Fig. 1.

Fig. 3 is a partial front view of the parts shown in Fig. 2.

Fig. 4 is a detail of one bracket and adjacent parts.

Fig. 5 indicates the brake pedal.

As shown in Fig. 1, I have illustrated portions of an automobile of the Ford type, showing the rear axle 2 with the brake drums 3 on the rear wheels 4, also frame members 5 and the transmission housing 6.

To each brake drum 3, I apply an external brake band 7, that is operated by an angle lever 8. One arm 9 of each angle lever, that is fast on the end portions of the cross shaft 10, projects radially toward the axle 2, see Fig. 2, and is pivoted to the extremity 11 of the brake band 7. The other arm 12 of the angle lever is connected with the extremity 13 of the brake band 7 by means of a pivot bolt 14, as shown in Fig. 4. When the shaft 10 is rocked by suitable means, such as an arm 15 fast to the shaft, that is drawn forward by a pull rod 16, connected with the brake pedal 17 on the transmission housing 6, the arm 9 of the angle lever will move downwardly and draw the band around the drum or flange 3, in the same rotative direction as the wheel is turning on the forward movement of the car. The other arm 12 of the angle lever will move outward and forward and hold this end of the brake band. Obviously the reverse swing of the angle lever will loosen the brake band.

Suitable means are provided for supporting the rock shaft 10 that is provided with the angle lever fast on each end, operating the brake drums on each wheel, as just described. In cars of this type, the radius rod 20 is usually forked at the rear extremity, to provide arms 21 and 22, that are secured to the axle housing 23, on each side by bolts 24 and 25. I provide a pair of angle brackets on each side, each having one arm 26 secured in these bolts, at one end and also at the middle or angle of the brackets, see Fig. 4. The other arm 27 of each bracket is enlarged to form a journal bearing 28 that receive the rock shaft 10, to swing therein. This forms a very secure and rigid journal bearing for the cross shaft, and obviously can be applied by merely removing the nuts on the two bolts for each radius rod, and attaching these brackets. The arm 15 is secured on the cross shaft near the middle portion, adjacent the shaft housing. The pull rod 16 extends forward, and can be secured to the pedal lever 17 by a clamp 18. Obviously this pedal is disconnected from the transmission brake, that is not longer needed, as it is supplanted by the external brake band on each rear wheel.

What I claim is:—

1. In an auto brake device, the combination of a brake drum on each rear wheel, of a brake band on each drum, angular brackets, one on each side, a rock shaft journalled in said brackets, an angle lever fast on said shaft at each end, one arm of said lever engaging one end of the brake band for direct pull thereon tangent to the arm, a bolt connected to the remainig end of said brake band and extending upwardly therefrom, the other arm of the angle lever projecting from the axis substantially at a right angle to said first arm and connected with the bolt at its upper end and in alinement therewith, an arm fast to the rock shaft, and a pull rod connecting said arm with the brake lever on the car control portion.

2. In an auto brake device, the combination with a vehicle having a rear axle housing and reach rods forked at their rear ends and connected to said housing, said vehicle having a pair of rear wheels; of a brake drum on each rear wheel, of a brake band on each drum, angular brackets, each having a vertical arm secured to the forked end of a respective reach rod and a horizontal arm projecting forwardly therefrom, a rock shaft journalled in said brackets, an angle lever fast on said shaft at each end, one arm of said lever engaging one end of the brake band for direct pull thereon tangent to the arm, a bolt connected to the remaining end of said brake band and extending upwardly therefrom, the other arm of the angle lever projecting from the axis substantially at a right angle to said first arm and connected with the bolt at its upper end and in alinement therewith, an arm fast to the rock shaft, and a pull rod connecting said arm with the brake lever on the car control portion.

Signed at New York city, N. Y. on August 25th, 1923.

OLIVER E. STEWART.